United States Patent
Weerackody

(10) Patent No.: US 6,950,389 B2
(45) Date of Patent: Sep. 27, 2005

(54) PEAK-TO-AVERAGE POWER REDUCTION IN AN ORTHOGONAL FREQUENCY DIVISION MULTIPLEXING SYSTEM

(75) Inventor: Vijitha Weerackody, New York, NY (US)

(73) Assignee: Agere Systems Inc., Allentown, PA (US)

( * ) Notice: Subject to any disclaimer, the term of this patent is extended or adjusted under 35 U.S.C. 154(b) by 864 days.

(21) Appl. No.: 09/785,717

(22) Filed: Feb. 16, 2001

(65) Prior Publication Data

US 2002/0150036 A1 Oct. 17, 2002

(51) Int. Cl.[7] .............................................. H04J 11/00
(52) U.S. Cl. ..................................... 370/210; 370/203
(58) Field of Search ................................ 370/203, 208, 370/210, 503, 507, 508, 516, 520

(56) References Cited

U.S. PATENT DOCUMENTS

| | | | |
|---|---|---|---|
| 6,125,103 A | | 9/2000 | Bauml et al. |
| 6,381,263 B1 | * | 4/2002 | Suzuki ........................ 375/148 |
| 6,459,679 B1 | * | 10/2002 | Kim ............................ 370/208 |
| 6,470,030 B1 | * | 10/2002 | Park et al. .................. 370/480 |
| 6,574,283 B1 | * | 6/2003 | Sakoda et al. .............. 375/262 |

OTHER PUBLICATIONS

S.H. Muller et al., "OFDM with Reduced Peak–to–Average Power Ratio by Optimum Combination of Partial Transmit Sequences", *Electronic Letters*, vol. 33, pp. 368–369, Feb. 1997.

D.J.G. Mestdagh et al., "A Method to Reduce the Probability of Clipping in DMT–Based Transceivers", *IEEE Transactions on Comminications*, vol. 44, pp. 1234–1238, Oct. 1996.

* cited by examiner

Primary Examiner—Duc Ho
Assistant Examiner—Thien D. Tran

(57) ABSTRACT

An Orthogonal Frequency Division Multiplexing (OFDM) transmission utilizes random phases across the OFDM sub-carrier components and differential encoding so that the phase information (i.e., phase values) does not have to be explicitly transmitted to a receiver. The OFDM data symbols are differentially encoded so that the phase information on the symbols that are multiplied together in the differential encoder is the same. Assuming use of a differential phase shift keying (DPSK) system, a phase sequence is used having "V" random phase values, where $\theta_{n,k}$ is the phase value in the $n^{th}$ sub-carrier in the $k^{th}$ OFDM symbol and is periodic in n with V as the period. A current input symbol is then differentially encoded relative to the $V^{th}$ previous encoded output from the encoder so that the phase values on the symbols multiplied together in the differential encoding process are the same.

33 Claims, 3 Drawing Sheets

PEAK-TO-AVERAGE POWER REDUCTION IN AN ORTHOGONAL FREQUENCY DIVISION MULTIPLEXING SYSTEM

TECHNICAL FIELD

This invention relates to transmission systems and, more particularly, to Orthogonal Frequency Division Multiplexing (OFDM) transmission systems.

BACKGROUND OF THE INVENTION

Orthogonal Frequency Division Multiplexing is used extensively in many transmission applications, for example, wireless communications systems, wireless LANs, Digital Audio Broadcasting, Digital Subscriber Loops, or the like. Unfortunately, a major disadvantage of an OFDM system is its large peak-to-average power ratio (PAPR). This results because OFDM is a multicarrier transmission system and, therefore, it is possible for the carrier components to align their phases and add coherently giving rise to large peak amplitudes. Several attempts have been made at solving this problem. In one attempt level-clipping is employed in which amplitudes above a prescribed threshold level are clipped before transmission. This affects the orthogonality of the OFDM symbols and, therefore increases the bit-error-rate. Other arrangements employ coding schemes to decrease the PAPR; however, the required coding overhead reduces the net transmission bit rate. In still other arrangements random phases are applied to the OFDM sub-carriers so that PAPR is reduced. However, the random phase information has to be supplied to the receiver in order to decode the received signal.

SUMMARY OF THE INVENTION

These and other problems and limitations are overcome in accordance with the invention by advantageously employing a transmission arrangement in which random phases are used across the OFDM sub-carrier components and by employing differential encoding so that the phase information (i.e., phase values) does not have to be explicitly transmitted to a receiver.

More specifically, the OFDM data symbols are differentially encoded so that the phase information on the symbols that are multiplied together in the differential encoder is the same.

In a specific embodiment, assuming use of differential phase shift keying (DPSK) encoding, a phase sequence is employed having "V" random phase values, where $\theta_{n,k}$ is the phase value in the $n^{th}$ sub-carrier in the $k^{th}$ OFDM symbol and is periodic in n with V as the period. A current input symbol is then differentially encoded relative to the $V^{th}$ previous encoded output from the encoder so that the phase values on the symbols multiplied together in the differential encoding process are the same. Advantageously, the differentially decoded output symbol at a remote receiver is substantially equal to the corresponding input symbol at the transmitter.

In another embodiment of the invention, V random phase values are employed in the phase sequences utilized in the differential encoding process and a threshold is set for a representation of the PAPR value at the transmitter. If the representation of the PAPR value is less than the threshold value, the corresponding OFDM symbol is transmitted. However, if the representation of the PAPR value exceeds the threshold value, the PAPR representation is re-computed using different random phase values until the PAPR representation value is below the threshold or until a prescribed number of iterations of the re-computation has been reached. Again, once the PAPR representation value is less than the threshold value, the corresponding OFDM symbol is transmitted. If the prescribed number of iterations has been reached, the computation process is terminated and the OFDM symbol that provided the smallest PAPR representation value is transmitted.

A significant technical advantage of the invention is that the phase sequence values employed at the transmitter do not have to be transmitted to the receiver along with the encoded symbols.

DETAILED DESCRIPTION

Figure 1:
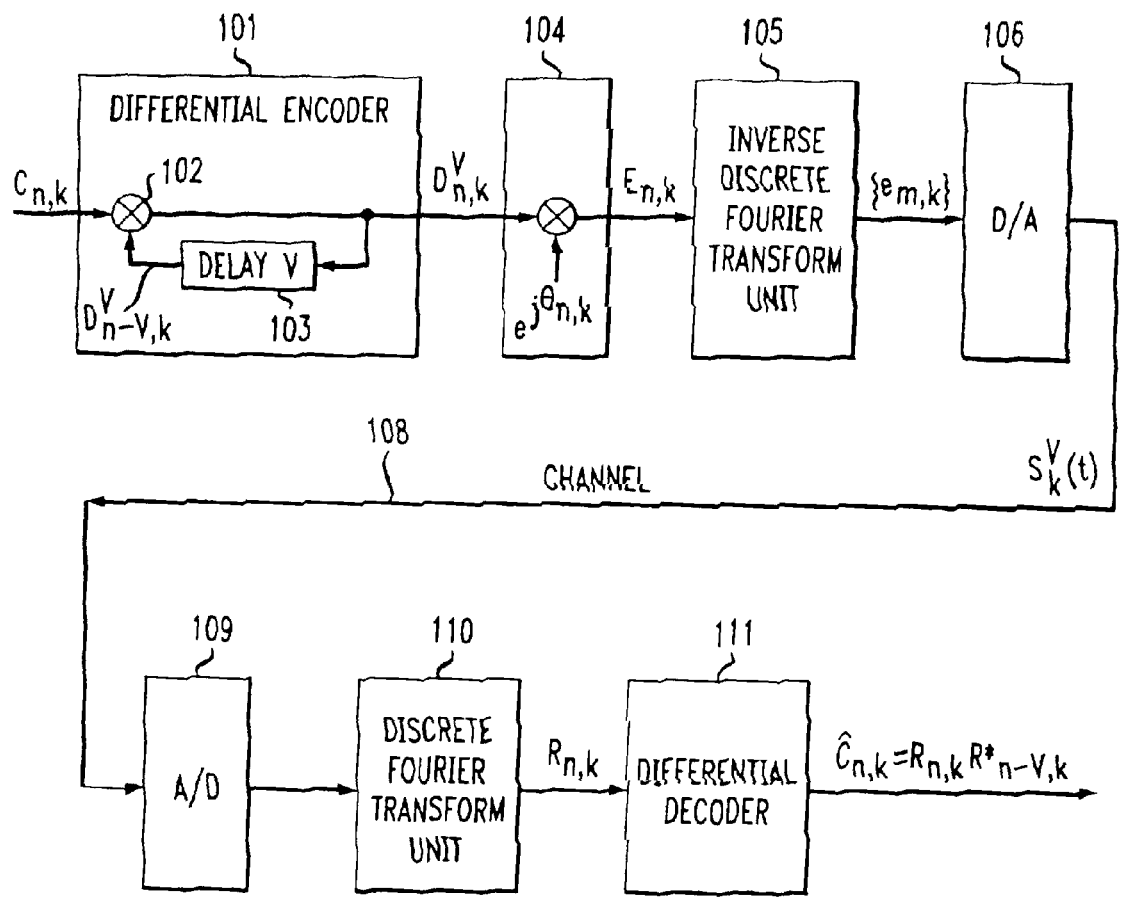
FIG. 1 shows, in simplified block diagram form, details of one embodiment of the invention.
Figure 2:
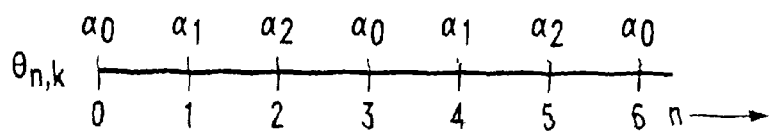
FIG. 2 graphically illustrates a phase sequence useful in describing the invention.

FIG. 1 shows, in simplified block diagram form, details of one embodiment of the invention. In this embodiment of the invention, a differential phase shift keying (DPSK) system is used and a phase sequence $\{\theta_{n,k}\}$ having V random phase values $\alpha_v$, where v=0, 1, ..., (V−1) is employed such that $$\theta_{n'V+v,k} = \alpha_v, v=0, 1, \ldots, (V-1), \tag{1}$$

where n is an integer such that $0 \leq (n'V+v) \leq (N-1)$. That is, $\theta_{n,k}$ is periodic in n, with V as the period. An example phase sequence is shown in FIG. 2, where V=3.

In this example, as shown in FIG. 1 differential phase shift keying (DPSK) encoder 101 generates $$D_{n,k}^V = C_{n,k} D_{n-V,k}^V, \tag{2}$$

where $C_{n,k}$ is the complex data symbol input and $D_{n,k}^V$ is the differentially encoded output complex data symbol component in the $n^{th}$ sub-carrier in the $k^{th}$ OFDM symbol, corresponding to $C_{n,k}$. This is realized by supplying $C_{n,k}$ as an input to differential encoder 101 and, therein, to a first input of multiplier 102. An output $D_{n,k}^V$ is supplied to delay unit 103, which yields $D_{n-V,k}^V$. In turn, $D_{n-V,k}^V$ is supplied to a second input of multiplier 102 where it is multiplied with $C_{n,k}$ to yield $D_{n,k}^V$. Thus, the current input symbol $C_{n,k}$ is differentially encoded with respect to the $V^{th}$ previous differentially encoded output $D_{n,k}^V$, namely, $D_{n-V,k}^V$. It is noted that differential encoder 101 is of a type known in the art. Then, $D_{n,k}^V$ is supplied to phase sequence unit 104 where it is multiplied by $e^{j\theta_{n,k}}$ to yield the inverse fast Fourier transform (IFFT), namely, $$E_{n,k} = e^{j\theta_{n,k}} D_{n,k}^V, n=0, 1, \ldots, (N-1). \tag{3}$$

Then, $E_{n,k}$ is supplied to inverse discrete Fourier transform (IDFT) unit 105 that generates the sequence of IDFT versions of $E_{n,k}$ denoted by $\{e_{m,k}\}$, for m=0, 1, ..., (N−1) as follows:

$$e_{m,k} = \sum E_{n,k} e^{j\frac{2\pi}{N}nm}, m = 0, 1, \ldots, (N-1). \quad (4)$$

Sequence $\{e_{m,k}\}$ is digital-to-analog converted via D/A converter 106 to yield an analog signal representation of the transmitted baseband signal for the $k^{th}$ OFDM symbol, $$s_k^V(t) = \begin{cases} \frac{1}{\sqrt{T_s}} \sum_{n=0}^{N-1} e^{j\theta_{n,k}} D_{n,k}^V e^{j2\pi\frac{n}{T_s}t} & t \in [kT_0, (k+1)T_0] \\ 0 & \text{otherwise} \end{cases} \quad (5)$$

that is supplied to transmission channel 108 to be transported to a remote receiver, in known fashion. Thus, it is seen that equation (4) is used in equation (5) to determine the N transmit samples, $$s_k^V\left(kT_0 + \frac{mT_s}{N}\right), m = 0, 1, \ldots, (N-1),$$

where $T_0$, the effective transmit duration of an OFDM symbol, is given by the sum of OFDM symbol interval $T_s$ and the cyclic extension duration $T_g$. Also, the number of sub-carriers is N and the total bandwidth of the transmitted signal is approximately $$\frac{N}{T_s}.$$

At the remote receiver, a received version of $s_k^V(t)$, namely, $\hat{s}_k^V(t)$, is analog-to-digital converted via A/D converter 109 and the resultant digital signal is supplied to discrete Fourier transform unit 110 where a DFT is performed on the N samples to obtain $$R_{n,k} = e^{j\theta_{n,k}} D_{n,k}^V, n = 0, 1, 2, \ldots, (N-1). \quad (6)$$

Note that in the above transform process channel impairments have been ignored such as fading and additive noise. Then, $R_{n,k}$ is differentially decoded, in this example, via differential phase shift keyed (DPSK) decoder 111 to yield $$\hat{C}_{n,k} = R_{n,k} R^*_{n-V,k}, \quad (7)$$

where "*" indicates the complex conjugate. Using the relationships of equations (2) and (6) with equation (7), it can be shown that $$\hat{C}_{n,k} = e^{j(\theta_{n,k} - \theta_{n-V,k})} C_{n,k}. \quad (8)$$

Since, $\theta_{n,k}$ has been chosen such that it is periodic in n, with period V, it can be shown that in the absence of channel impairments and noise that at the receiver $$\hat{C}_{n,k} = C_{n,k}. \quad (9)$$

Thus, it is seen that there is no need to explicitly transmit the phase information, i.e., phase values, as overhead with the transmitted symbols, and the PAPR is reduced, in accordance with the invention.

Figure 3:
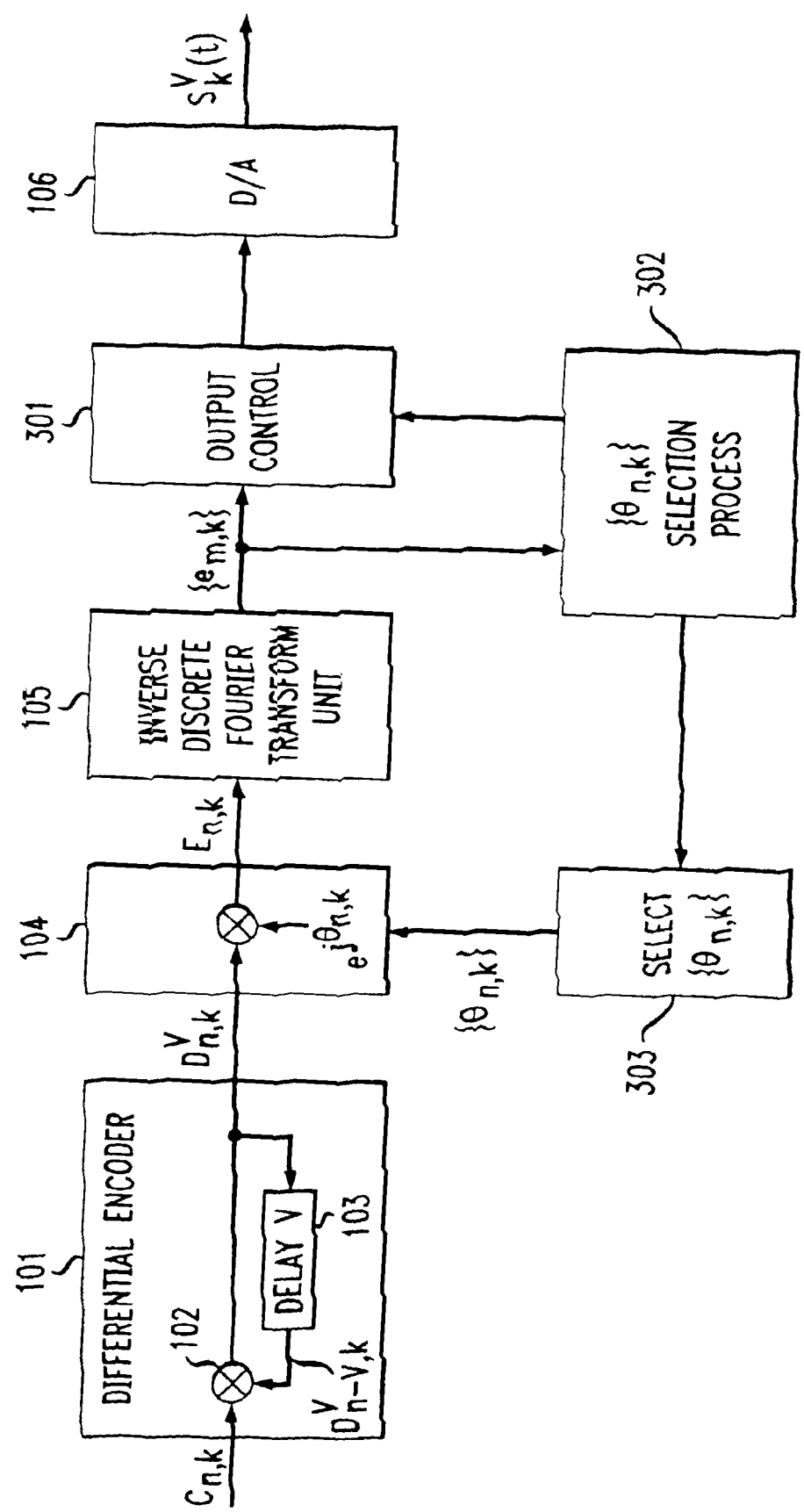
FIG. 3 shows, in simplified block diagram form, details of another embodiment of the invention.

FIG. 3 shows, in simplified block diagram form, details of another embodiment of the invention. The elements of the embodiment shown in FIG. 3 that are essentially identical as those employed in the embodiment of FIG. 1 have been similarly numbered and will not be described again in detail. As indicated above, it is not necessary to explicitly transmit the phase sequences $\{\theta_{n,k}\}$ because they are periodic in n and there are V random phases $\alpha_v$, $v=0, 1, \ldots, (V-1)$. It may be desirable to select a threshold value for the PAPR. Then, if the PAPR is equal to or less than the threshold the corresponding symbol is transmitted. However, if the PAPR exceeds the threshold value then the PAPR is recomputed using a different set of phase values $\alpha_v$ until it becomes equal to or less than the threshold. Since the computational power of the transmitter is limited, only a prescribed number of iterations of the recomputing process is made. Specifically, after the $p^{th}$ iteration of the computation of PAPR, the OFDM symbol that yields the smallest value for PAPR is selected and transmitted.

To this end, the transmitter includes output control 301 for controlling, via $\{\theta_{n,k}\}$ selection processor 302, transmission of the OFDM symbols to a remote receiver. $\{\theta_{n,k}\}$ selection processor 302 also controls the selection of new phase values via select $\{\theta_{n,k}\}$ unit 303. Select $\{\theta_{n,k}\}$ unit 303 supplies the new phase values $\{\theta_{n,k}\}$ to phase sequence unit 104 where they are employed to generate new values for $E_{n,k}$.

Figure 4:
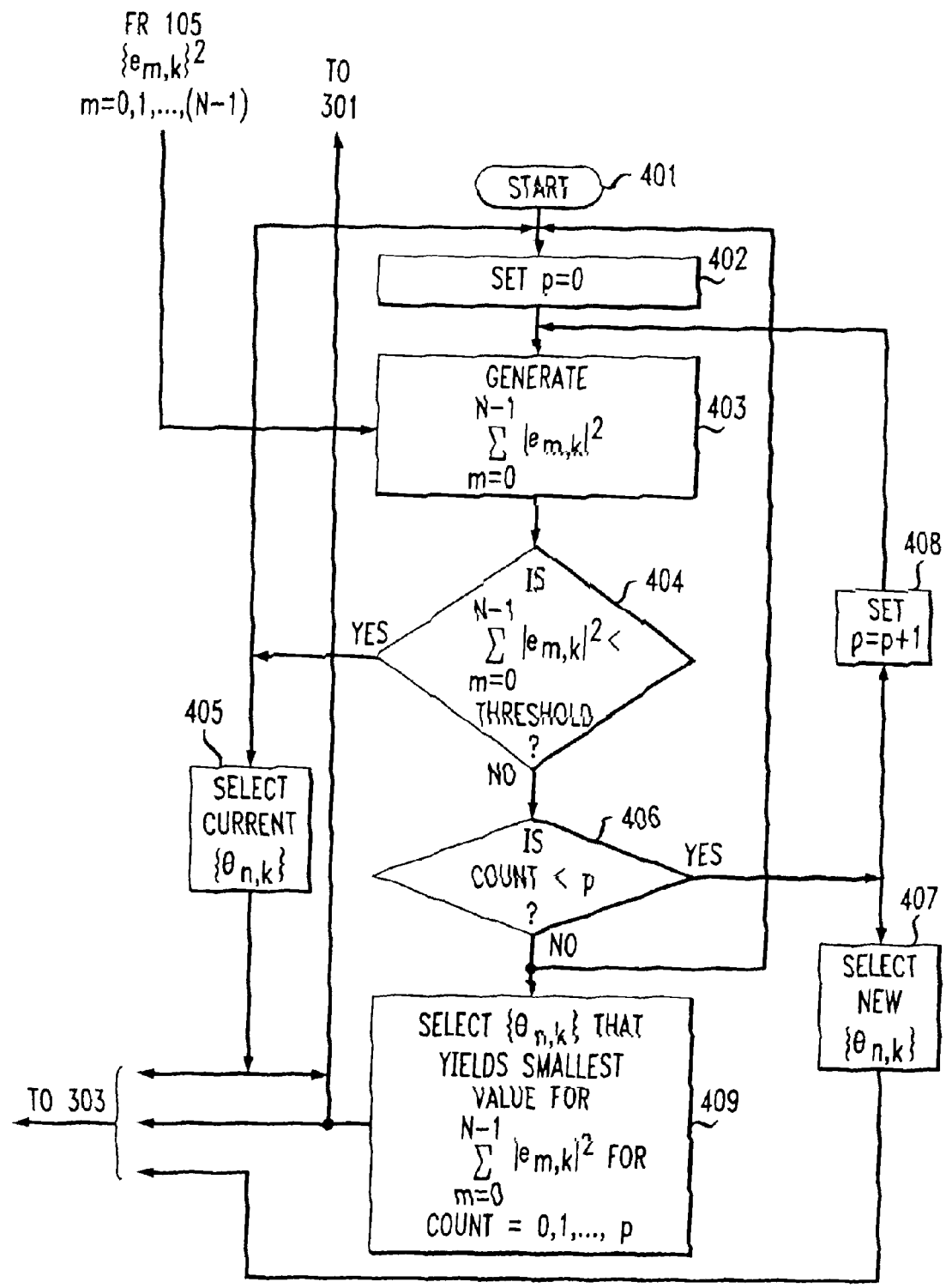
FIG. 4 is a flow chart illustrating steps in a process for recomputing a PAPR representation value and useful in describing the embodiment of the invention shown in FIG. 3.

FIG. 4 is a flow chart illustrating steps in a process for recomputing a PAPR representation value and useful in describing the embodiment of the invention shown in FIG. 3. Specifically, FIG. 4 is a flow chart of the operation of $\{\theta_{n,k}\}$ selection processor 302. Thus, the process is started in step 401. Thereafter, step 402 sets the iteration index p=0, i.e., initializes the process. Step 403 generates a prescribed relationship $$\sum_{m=0}^{N-1} |e_{m,k}|^2,$$

which is a representation of PAPR. To this end, sequence $\{e_{m,k}\}$, where $m=0, 1, \ldots, (N-1)$, is supplied from inverse discrete Fourier transform unit 105. Then, step 404 tests to determine whether $$\sum_{m=0}^{N-1} |e_{m,k}|^2 < \text{Threshold}.$$

If the test result in step 404 is YES, control is returned to step 402 and step 405 causes the current phase sequence $\{\theta_{n,k}\}$ to be selected by sending an appropriate control signal to select $\{\theta_{n,k}\}$ unit 303 (FIG. 3). Additionally, a control signal is supplied to transmission control 301 (FIG. 3) to enable it to transmit the corresponding OFDM symbol, i.e., to be in a transmit state. Note that transmission control 301 is normally in an inhibit transmission state. Returning to step 404, if the test result is NO, step 406 tests to determine if count<p, i.e., whether fewer than p recomputation iterations have been made. If the test result is YES, the $p^{th}$ iteration has not been reached and step 407 causes a new phase sequence $\{\theta_{n,k}\}$ to be selected. To this end, an appropriate control signal is sent to select $\{\theta_{n,k}\}$ unit 303 (FIG. 3) in order to effect the selection. Additionally, step 408 sets p=p+1, and then control is returned to step 403 which recomputes $$\sum_{m=0}^{N-1} |e_{m,k}|^2$$

using the new sequence $\{e_{m,k}\}$ based on the new phase sequence $\{\theta_{n,k}\}$. Returning to step 406, if the test result is YES, the $p^{th}$ recomputation iteration has been reached and the value of $$\sum_{m=0}^{N-1} |e_{m,k}|^2$$

is still greater than the Threshold value. In this instance step 409 then selects the phase sequence $\{\theta_{n,k}\}$ that yielded the smallest value for $$\sum_{m=0}^{N-1} |e_{m,k}|^2$$

during the p iterations. An appropriate control signal is sent to select $\{\theta_{n,k}\}$ unit 303 (FIG. 3) in order to effect the selection. Also, a control signal is supplied to transmission control 301 (FIG. 3) to enable it to transmit the corresponding OFDM symbol. Control is also returned to step 402 where the computation process is initializes by setting p=0.

It has been observed that for increasing values of V and p the probability of clipping decreases and that it is possible to obtain arbitrarily small values of probability by increasing the number of iterations p.

The above-described embodiments are, of course, merely illustrative of the principles of the invention. Indeed, numerous other methods or apparatus may be devised by those skilled in the art without departing from the spirit and scope of the invention. Moreover, the invention may be implemented as hardware, as an integrated circuit, via programming on a microprocessor, on a digital signal processor or the like.

What is claimed is:

1. A transmitter for use in an Orthogonal Frequency Division Multiplexing (OFDM) based transmission system, the transmitter comprising:
    a differential encoder that generates a corresponding encoded output symbol from a corresponding input symbol to said transmitter, said differential encoder including a multiplier for multiplying said input symbol with a prescribed previous output symbol from said differential encoder so that the phase values of said input symbol and said prescribed previous output symbol are the same;
    an inverse fast Fourier transform unit that generates inverse fast Fourier transform versions of output symbols from said differential encoder; and
    an inverse discrete Fourier transform unit that generates inverse discrete Fourier transform versions of said inverse fast Fourier transform versions of said differential encoder output symbols as transmitter output data symbols,
    wherein phase values of said transmitter output data symbols are not required to be transmitted to a remote receiver for said receiver to generate received versions of said input symbols corresponding to said transmitter output data symbols.

2. The transmitter as defined in claim 1 wherein said prescribed previous output symbol from said differential encoder is a $V^{th}$ previous differential encoder output symbol, where V>1.

3. The transmitter as defined in claim 2 wherein said inverse fast Fourier transform unit employs a prescribed phase sequence $\{\theta_{n,k}\}$ to generate said inverse fast Fourier transform versions, wherein said prescribed phase sequence $\{\theta_{n,k}\}$ is periodic in n, with period V and n is the $n^{th}$ sub-carrier in a $k^{th}$ OFDM symbol.

4. The transmitter as defined in claim 3 wherein said differential encoder is supplied with input data symbol $C_{n,k}$ and generates output data symbol $D_{n,k}^V$, in accordance with $D_{n,k}^V = C_{n,k} D_{n-V,k}^V$.

5. The transmitter as defined in claim 4 wherein said inverse fast Fourier transform unit includes a multiplier to generate said inverse fast Fourier transform versions $E_{n,k}$ by multiplying said output data symbols $D_{n,k}^V$ with $e^{j\theta_{n,k}}$, in accordance with $E_{n,k} = e^{j\theta_{n,k}} D_{n,k}^V$, for n=0, 1, ..., (N-1) and where N is a number of OFDM sub-carriers employed in said OFDM based transmission system.

6. The transmitter as defined in claim 5 wherein said inverse discrete Fourier transform unit is supplied with said inverse fast Fourier transform versions $E_{n,k}$ to generate said inverse discrete Fourier transform versions $e_{m,k}$, in accordance with $$e_{m,k} = \sum E_{n,k} e^{j\frac{2\pi}{N} nm}, \text{ for } m = 0, 1, \ldots, (N-1).$$

7. The transmitter as defined in claim 6 wherein OFDM symbols to be transmitted for said encoder output data symbols $D_{n,k}^V$ are $$s_k^V(t) = \begin{cases} \frac{1}{\sqrt{T_s}} \sum_{n=0}^{N-1} e^{j\theta_{n,k}} D_{n,k}^V e^{j2\pi \frac{n}{T_s} t} & t \in [kT_0, (k+1)T_0] \\ 0 & \text{otherwise,} \end{cases}$$

where $T_0$ is the effective transmit duration of an OFDM symbol and $T_s$ is the OFDM symbol interval.

8. The transmitter as defined in claim 4 wherein said differential encoder is a differential phase shift keying (DPSK) encoder.

9. The transmitter as defined in claim 1 further including a transmit output control responsive to a control signal for controlling transmission of OFDM symbols, a phase sequence selection processor supplied with said inverse discrete Fourier transform versions for generating said control signal to enable transmission of an OFDM symbol in accordance with prescribed criteria.

10. The transmitter as defined in claim 9 wherein said prescribed criteria includes making a first determination of whether a value of a prescribed relationship of a sequence of said inverse discrete Fourier transform versions $\{e_{m,k}\}$, for m=0, 1, ..., (N-1), where N is a number of OFDM sub-carriers and k is a $k^{th}$ OFDM symbol, is at least less than a predetermined threshold value, and when said value of said prescribed relationship is determined to be at least less than said predetermined threshold, generating said control signal to enable transmission of a corresponding OFDM symbol.

11. The transmitter as defined in claim 10 wherein said prescribed previous output symbol from said differential encoder is a $V^{th}$ previous output symbol, where V>1 and said inverse fast Fourier transform unit employs a prescribed phase sequence $\{\theta_{n,k}\}$ to generate said inverse fast Fourier transform versions, where said prescribed phase sequence $\{\theta_{n,k}\}$ is periodic in n with period V and n is the $n^{th}$ sub-carrier in the $k^{th}$ OFDM symbol, and wherein said prescribed criteria further includes when said determination indicates that said value of said prescribed relationship of said inverse discrete Fourier transform versions $\{e_{m,k}\}$ is not less than said predetermined threshold value, selecting a new phase sequence $\{\theta_{n,k}\}$ to generate new versions of said inverse fast Fourier transform $E_{n,k}$ for n=0, 1, ..., (N-1), where N is a number of OFDM sub-carriers and said sequence of discrete Fourier transform versions $\{e_{m,k}\}$.

12. The transmitter as defined in claim 11 wherein said prescribed criteria further includes when said determination indicates that said value of said prescribed relationship of said sequence of said new inverse discrete Fourier transform versions $\{e_{m,k}\}$ is at least less than said predetermined threshold value, generating said control signal to enable transmission of a corresponding OFDM symbol and, if not, selecting a new phase sequence and repeat generating a new sequence $\{e_{m,k}\}$ and making said first determination until said value of said prescribed relationship is at least less than said predetermined threshold value or a predetermined number of recomputations of said sequence $\{e_{m,k}\}$ is reached, and when said determination indicates that said value of said prescribed relationship of said sequence of said new inverse discrete Fourier transform versions $\{e_{m,k}\}$ is not at least less than said predetermined threshold value and said predetermined number of recomputations has been reached select the phase sequence $\{\theta_{n,k}\}$ that generated the smallest value for said prescribed relationship and generate said control signal to enable transmission of a OFDM symbol corresponding to said phase sequence that caused the smallest value for said prescribed relationship to be generated.

13. The transmitter as defined in claim 12 wherein said prescribed relationship is $$\sum_{m=0}^{N-1} |e_{m,k}|^2, \text{ for } m = 0, 1, \ldots, (N-1).$$

14. A transmitter for use in an Orthogonal Frequency Division Multiplexing (OFDM) based transmission system, the transmitter comprising:
    means for differentially encoding a input symbol to said transmitter to generate a corresponding differentially encoded output symbol, said means for differentially encoding including means for multiplying said transmitter input symbol with a prescribed encoded output symbol so that the phase values of said input symbol and said prescribed previous output symbol are the same;
    means for generating inverse fast Fourier transform versions of said differentially encoded output symbols from said means for differentially encoding; and
    means for generating inverse discrete Fourier transform versions of said inverse fast Fourier transform versions of said encoded output symbols as transmitter output data symbols,
    wherein phase values of said transmit data symbols are not required to be transmitted to a remote receiver for said receiver to generate received versions of said input symbols corresponding to said transmitter output data symbols.

15. The transmitter as defined in claim 14 wherein said prescribed differentially encoded output symbol is a $V^{th}$ previous differentially encoded output symbol, where V>1.

16. The transmitter as defined in claim 15 wherein said means for generating said inverse fast Fourier transform versions includes means for multiplying said encoded output symbols with a prescribed relationship of a prescribed phase sequence $\{\theta_{n,k}\}$ to generate said inverse fast Fourier transform versions, where said prescribed phase sequence $\{\theta_{n,k}\}$ is periodic in n, with period V and n is a $n^{th}$ sub-carrier in a $k^{th}$ OFDM symbol.

17. A method for use in a transmitter of an Orthogonal Frequency Division Multiplexing (OFDM) based transmission system, the method in said transmitter comprising the steps of:
    differentially encoding an input symbol said transmitter to generate a corresponding differentially encoded output symbol, said step of differentially encoding including a step of multiplying said input symbol with a prescribed differentially encoded output symbol so that the phase values of said transmitter input symbol and said prescribed previous differentially encoded output symbol are the same;
    inverse fast Fourier transforming to generate inverse fast Fourier transform versions of output symbols from said differential encoder; and
    inverse discrete Fourier transforming to generate inverse discrete Fourier transform versions of said inverse fast Fourier transform versions as transmitter output data symbols,
    wherein phase values of said transmitter output data symbols are not required to be transmitted to a remote receiver for said receiver to generate received versions of said input symbols corresponding to said transmitter output data symbols.

18. The method as defined in claim 17 wherein said prescribed differentially encoded output symbol is a $V^{th}$ previous differentially encoded output symbol, where V>1.

19. The method as defined in claim 18 wherein said step of inverse fast Fourier transforming includes a step of utilizing a prescribed phase sequence $\{\theta_{n,k}\}$ to generate said inverse fast Fourier transform versions, where said prescribed phase sequence $\{\theta_{n,k}\}$ is periodic in n, with period V and n is a $n^{th}$ sub-carrier in a $k^{th}$ OFDM symbol.

20. The method as defined in claim 19 wherein said step of differentially encoding is supplied with transmitter input symbol $C_{n,k}$ and generates differentially encoded output data symbol $D_{n,k}^V$, in accordance with $D_{n,k}^V = C_{n,k}D_{n-V,k}^V$.

21. The method as defined in claim 20 wherein said step of inverse fast Fourier transforming includes a step of multiplying said differentially encoded output data symbols $D_{n,k}^V$ with $e^{j\theta_{n,k}}$ to generate said inverse fast Fourier transform versions $E_{n,k}$, in accordance with $e^{j\theta_{n,k}}D_{n,k}^V$, for n=0, 1, . . . , (N−1), where N is a number of OFDM sub-carriers employed in said OFDM based transmission system.

22. The method as defined in claim 21 wherein said step of inverse discrete Fourier transforming includes a step of generating said inverse discrete Fourier transform versions $e_{m,k}$, in accordance with $$e_{m,k} = \sum E_{n,k} e^{j\frac{2\pi}{N}nm}, \text{ for } m = 0, 1, \ldots, (N-1),$$

in response to said inverse fast Fourier transform versions $E_{n,k}$.

23. The method as defined in claim 22 wherein OFDM symbols to be transmitted for said differentially encoded output data symbols $D_{n,k}^V$ is $$s_k^V(t) = \begin{cases} \frac{1}{\sqrt{T_s}} \sum_{n=0}^{N-1} e^{j\theta_{n,k}} D_{n,k}^V e^{j2\pi \frac{n}{T_s}t} & t \in [kT_0, (k+1)T_0] \\ 0 & \text{otherwise,} \end{cases}$$

where $T_0$ is the effective transmit duration of an OFDM symbol and $T_s$ is the OFDM symbol interval.

24. The method as defined in claim 20 wherein said step of differentially encoding utilizes differential phase shift keying (DPSK) encoding.

25. The method as defined in claim 17 further including a step of controlling transmission of OFDM symbols in response to a control signal, a step of selecting a phase sequence in response to said inverse discrete Fourier transform versions to generate said control signal to enable transmission of an OFDM symbol in accordance with prescribed criteria.

26. The method as defined in claim 25 wherein said prescribed criteria includes a first step of determining whether a value of a prescribed relationship of a sequence of said inverse discrete Fourier transform versions $\{e_{m,k}\}$, for m=0, 1, . . . , (N-1), where N is a number of OFDM sub-carriers and k is a $k^{th}$ OFDM symbol, is at least less than a predetermined threshold value, and when said first step of determining indicates that said value of said prescribed relationship is at least less than said predetermined threshold, generating said control signal to enable transmission of a corresponding OFDM symbol.

27. The method as defined in claim 26 wherein said prescribed differentially encoded output symbol is a $V^{th}$ previous differentially encoded output symbol, where V>1 and said step of inverse fast Fourier transforming includes a step of utilizing a prescribed phase sequence $\{\theta_{n,k}\}$ to generate said inverse fast Fourier transform versions, where said prescribed phase sequence $\{\theta_{n,k}\}$ is periodic in n with period V and n is the $n^{th}$ sub-carrier in the $k^{th}$ OFDM symbol, and wherein said prescribed criteria further includes, if said value of said prescribed relationship of said inverse discrete Fourier transform versions $\{e_{m,k}\}$ is not less than said predetermined threshold value, a step of selecting a new phase sequence $\{\theta_{n,k}\}$ to generate new versions of said inverse fast Fourier transform $E_{n,k}$ for n=0, 1, . . . , (N-1), where N is a number of OFDM sub-carriers and said sequence of discrete Fourier transform versions $\{e_{m,k}\}$.

28. The method as defined in claim 27 wherein said prescribed criteria further includes said first determining step determining whether a value of said prescribed relationship of said sequence of said new inverse discrete Fourier transform versions $\{e_{m,k}\}$ is at least less than said predetermined threshold value, when said step of determining indicates that said value of said prescribed relationship is at least less than said predetermined threshold, a step of generating said control signal to enable transmission of a corresponding OFDM symbol and when said step of determining indicates that said value of said prescribed relationship is not at least less than said predetermined threshold, a step of selecting a new phase sequence and repeat generating a new sequence $\{e_{m,k}\}$ and repeating said step of first determining until said value of said prescribed relationship is at least less than said predetermined threshold value or a predetermined number of recomputations of said sequence $\{e_{m,k}\}$ is reached, when said predetermined number of recomputations has been reached, a step of selecting the phase sequence $\{\theta_{n,k}\}$ that generated the smallest value for said prescribed relationship and a step of generating said control signal to enable transmission of a OFDM symbol corresponding to said phase sequence that caused the smallest value for said prescribed relationship to be generated.

29. The method as defined in claim 28 wherein said prescribed relationship is $$\sum_{m=0}^{N-1} |e_{m,k}|^2, \text{ for } m = 0, 1, \ldots , (N-1).$$

30. Apparatus for use in an Orthogonal Frequency Division Multiplexing (OFDM) based transmission system in which OFDM symbols are transmitted to a receiver, in accordance with $$s_k^V(t) = \begin{cases} \dfrac{1}{\sqrt{T_s}}\sum_{n=0}^{N-1} e^{j\theta_{n,k}} D_{n,k}^V e^{j2\pi \frac{n}{T_s}t} & t \in [kT_0, (k+1)T_0] \\ 0 & \text{otherwise,} \end{cases}$$

where the phase sequence $\theta_{n,k}$ is periodic in n with period V and n is the $n^{th}$ sub-carrier in the $k^{th}$ OFDM symbol and $D_{n,k}^V$ is generated in a differential encoder where a current input data symbol to the encoder is multiplied by the $V^{th}$ previous output data symbol from said encoder, the receiver including apparatus comprising:

a discrete Fourier transform unit that generates discrete Fourier transform versions of digital received versions of said transmitted OFDM data symbols; and a differential decoder that generates a corresponding decoded output symbol from a corresponding Fourier transformed version of a received version of said transmitted OFDM data symbols, said decoder including a multiplier for multiplying said input symbol with a prescribed previous input symbol to generate a received OFDM data symbol, whereby phase values of said transmit data symbols are not required to be transmitted to a remote receiver for said receiver to generate received versions of said input symbols corresponding to said transmit data symbols.

31. The apparatus as defined in claim 30 wherein said prescribed previous output symbol from said encoder is a $V^{th}$ previous encoder output symbol, where V>1.

32. The apparatus as defined in claim 31 wherein said discrete Fourier transform unit is supplied with digital versions of said received OFDM data symbols and generates discrete Fourier transforms versions of said received OFDM data symbols in accordance with $R_{n,k}=e^{j\theta_{n,k}}D_{n,k}^V$, for n=0, 1, . . . , (N-1).

33. The apparatus as defined in claim 32 wherein said differential decoder is supplied with said discrete Fourier transformed versions of said received OFDM data symbols and generates received versions of said transmitted OFDM data symbols in accordance with $\hat{C}_{n,k}=R_{n,k}R^*_{n-V,k}$, where "*" indicates the complex conjugate.

* * * * *